United States Patent

Fuchs

[15] 3,655,426
[45] Apr. 11, 1972

[54] PROCESS OF COATING METAL WITH POLYVINYL FLUORIDE AND RESULTANT PRODUCT

[72] Inventor: Otto Fuchs, Troisdorf-Oberlar, Germany

[73] Assignee: Dynamit Nobel Aktiengesellschaft, Troisdorf, near Cologne, Germany

[22] Filed: Oct. 27, 1969

[21] Appl. No.: 869,912

[30] Foreign Application Priority Data

Nov. 2, 1968 Germany .................. P 18 06 551.5

[52] U.S. Cl. .................. 117/75, 117/49, 117/7 M, 117/132 CF, 161/189, 161/218
[51] Int. Cl. .................. B44d 1/14, B32b 15/08
[58] Field of Search .......... 117/132 CF, 75, 70 C; 161/189, 161/218

[56] References Cited

UNITED STATES PATENTS

| 3,340,222 | 9/1967 | Fang | 117/132 CF X |
| 3,360,396 | 12/1967 | Kennedy et al. | 117/132 CF |
| 3,377,193 | 4/1968 | Stilmar | 117/132 CF X |
| 3,429,844 | 2/1969 | Neros et al. | 117/132 CF X |
| 3,454,517 | 7/1969 | Neros et al. | 117/132 CF X |

*Primary Examiner*—William D. Martin
*Assistant Examiner*—Ralph Husack
*Attorney*—Burgess, Dinklage & Sprung

[57] ABSTRACT

In the coating of metal with polyvinyl fluoride by applying a primer coat to the metal surface and applying a finish coat of polyvinyl fluoride over the primer coat, the improvement which comprises providing the primer coat by applying a mixture of basically reacting metal oxide and polyvinyl fluoride dissolved or suspended in an organic solvent, drying the primer coat, and applying on the primer coat, a coat of polyvinyl fluoride.

15 Claims, No Drawings

3,655,426

PROCESS OF COATING METAL WITH POLYVINYL FLUORIDE AND RESULTANT PRODUCT

BACKGROUND

The use of sheet metals for technical purposes, especially for construction, requires that they be suitably protected against corrosion. The coating of metals with plastics as a suitable means of protection against corrosion has already acquired technical importance. It has long been in the prior art to bond steel or aluminum sheet metal to PVC sheets or to coat the metal with PVC plastisols and PVC organosols.

In these known processes, the metal in continuous sheet form is first mechanically cleaned of roll scale and rust by brushing or sand blasting, then degreased in solvent or alkali baths, and then the bright metal is protected against oxidation by phosphatizing (in the case of steel) or chromatizing (in the case of aluminum). Finally, the metal surface is first coated with a primer and then with a PVC dispersion and each coat is baked on. Priming is essential to the perfect bonding of the weakly polar plastisol film to the metallic base.

In recent years, self-adhering plastisols and organosols have been developed—the so-called "one-coat" plastisols and organosols. By the incorporation of adhesion-improving components (e.g., vinyl chloride copolymers, vinylidene chloride copolymers, epoxy resins, phenolic resins, polyacrylates, polymethacrylates, unsaturated polyester resins etc.) good adhesion to steel, and to aluminum and other non-ferrous metals, is obtained, so that the use of a primer can be dispensed with.

Coating the metal surface with only one coat of plastic on the basis of self-adhering plastisols or organosols has the disadvantage that great thicknesses of coating cannot be obtained. The weather resistance and chemical resistance of such metals covered with one coat of plastic is poorer, in spite of good adhesion and wear and shock resistance than in the case of priming plus finish coating, so that the one-coat finishing of the metal surface with plastics is definitely inferior in protective action to the above-described two-coat finish.

To achieve an improvement in the protection of metals over the PVC finishes that have been used hitherto, polyvinyl fluoride (PVF) finishes have been used since some time, especially for outdoor applications. PVF-coated steel sheets are marketed, which are galvanized or ungalvanized sheet steel to which a sheet of polyvinyl fluoride is bonded by means of a sizing adhesive made, for example, on a basis of methacrylic acid esters.

It is furthermore in the prior art to coat metals with PVF dispersions in high-boiling organic solvents. These PVF films, however, are only slightly harder to pull away from metals than they are from glass sheets, from which these films are very easy to remove (cf. French Pat. No. 1,388,580). Also, in French Pat. No. 1,388,581, PVF dispersions are described in which dissolved PVF, polyvinylidene fluoride or polymethyl methacrylate are simultaneously present, and which can be used to produce a uniform coating on metals. In these dispersions, however, the polymethyl methacrylate does not act as a bonding agent, but serves to eliminate the dilatancy of the PVF dispersions. Since, however, it appears that a PVF coating performs better under exposure to weather than a methacrylate coating, methacrylate ought not to be used at all, if possible, or at least not in the finish coat.

The adhesion between the metal surface and a PVF coating must be brought about by a film of bonding agent which not only has good adherence to degreased, phosphatized or chemically and galvanically treated metals, but also a good resistance to solvents, stabilizers and dispersants. Therefore it is usually greatly cross-linked in order thereby to prevent or reduce the penetration of plasticizers or solvents.

The use of primer adhesive coatings on a basis of acrylates, epoxies, polyesters and the like, which are applied separately to the metal sheets, as bonding agents for a subsequent coating with PVF-solvent dispersions, is not suitable, because, particularly at the relatively high bake-on temperatures, the agressive solvents of the dispersions dissolve or break up the adhesive coatings excessively, preventing the formation of practical PVF coatings. This method of coating is therefore applicable only when previously formed PVF sheets are to be bonded to the metal.

THE INVENTION

A perfect coating of metals with PVF dispersions is successfully possible only under the following conditions:

a. The metal must be covered with a plurality of coats, a pore-free seal being assured by the application of at least two coats (primer and finish coats).

The ground coat applied to the metal must act as a primer and assure a strong bond to the metal. After the baking process, it must not be substantially affected, and must be only slightly softened by the solvent in the finish dispersion next applied, even at baking temperatures of, e.g., 270° C. and more, in order to permit a firmly adherent application of the finish coating.

c. The finish coat is to contain only or consist essentially of PVF as its polymeric component, with pigments and stabilizers added if desired.

These requirements are met by a method of coating metals with polyvinyl fluoride by the application of a bond-providing ground or primer coat to the metal surface, followed by the application of a finish coat of polyvinyl fluoride, which is characterized in that a mixture of basically reacting metal oxides and polyvinyl fluoride powder, preferably in a weight-ratio of 1:3 to 1:8, dissolved or suspended in a latent solvent, is applied to the metal surface as the bond-providing ground coat. A coat of polyvinyl fluoride is then applied on the primer coat in a known manner. The ground or primer coat can be baked on at temperatures e.g. between 230° C. and 320° C., preferably between 250° C. and 280° C., and then the finish coat can be applied and baked on in a known manner, the said finish coat consisting of or consisting essentially of polyvinyl fluoride with pigments and stabilizers added if desired.

The primer or ground coat applied to the metal surface is to be as close as possible to 5 to 20 microns thick. The thickness of this coating depends substantially on the amount of latent solvent used. The said coating thicknesses are obtained when the weight ratio of basically acting metal oxide and PVF powder to the latent solvent ranges from 1:1 to 1:4. However, a greater or lesser latent solvent content is also possible.

In the preparation of the dispersions, first a concentrated, thick paste is prepared from the solids and a part of the solvent. This paste is homogenized by several passages through a roller mixer, and then it is diluted with the remaining solvent and finally deaerated by means of a vacuum.

The application of the ground coat to the metal sheets, plates or foils is performed according to known methods by immersion, spraying or brushing. The use of the immersion process is advantageous, especially when both the bottom and the top surfaces of the metal are to be coated.

If the coating is applied to light metal alloys, the baking temperature ought not to exceed 270° C., because at higher temperatures the strength characteristics of these alloys may be adversely affected. The baking time depends on the thickness of the metal and on the temperature. Best results are obtained when the baking time is at least long enough for the entire piece of metal to assume the desired temperature. In general this takes 2 to 6 minutes.

The ground coat applied in this manner is very adherent and shows no signs of loosening in cross scoring and grid scoring followed by deep drawing of 10 mm according to Erichsen. Although the phosphatizing and chromatizing of the metals to be coated is recommended only when no more forming is to be performed after the coating, sheet metals which have been pretreated in that manner and provided with the above-described priming and then finished coated, can be deep-drawn to the point of rupture without loosening of the coating.

By basically acting metal oxides are meant particularly the oxides of the metals of Group II of the Periodic Table (Mendelyeev), especially the oxides of magnesium and the alkaline earth metals (calcium, strontium, and barium), as well as PbO and ZnO. These oxides are to be very finely divided, in the form of a fine, loose, reactive powder. The basic oxides used best have an average grain size of less than 25 microns, and preferably less than 5 microns. Desirably the grain fineness is 100 percent less than 10 microns, better less than 5 microns.

All types of polyvinyl fluoride can be used which form dipping, spraying or brushing dispersions with the solvents mentioned below.

The solvent can be an organic solvent containing a carbonyl group. Among the suitable dispersants and latent solvents for PVF are N-alkyl substituted low aliphatic carboxylic acid amides such as N,N-dimethylformamide, N,N-dimethylacetamide, N,N-diethylformamide, N,N-dimethyl-γ-hydroxyacetamide, N,N-dimethyl-γ-hydroxybutyramide, N,N-dimethyllactamide, N,N-dimethylmethoxyacetamide, N-methylformamide or N-methylacetamide. Also suitable are compounds containing carbonyl groups such as ketones. Well suited are acetophenone, acetylacetone, cyclohexanone, dibutylketone, isophorone, mesityl oxide, methylamylketone, 3-methylcyclohexanone, bis-(methoxymethyl)-urone, 2-piperidone, N-methyl-2-piperidone, N-ethyl-2-pyrrolidone, N-methyl-2-pyrrolidone, N-isopropyl-2-pyrrolidone or 5-methyl-2-pyrrolidone.

Cyclic esters of carbonic acid are also suitable as latent solvents, examples being ethylene carbonate, propylene carbonates, butylene carbonates or trimethylene carbonate. Also, lactones such as β-propiolactone, δ-valerolactone, γ,γ-dimethyl-δ-valerolactone, γ-valerolactone, γ-butyrolactone and its β and γ substituted alkyl derivatives, α- and β-angelicalactone, ε-caprolactone, etc. Also suitable are dialkyl esters of phthalic acid, quinoline, isoquinoline, pyridine and tetramethylurea.

The preferred latent solvents are propylene carbonate, dimethyl formamide, isophorone or γ-butyrolactone, and mixtures thereof.

In addition to the finely powdered basically acting oxides, small amounts of extender fillers or pigments on the basis of microminerals, such as microkaolin, microquartz or microsilicates having a grain size of less than 20 microns, preferably less than 10 microns, can be added to the ground coat.

After the ground coat has been applied and baked on, one or more intermediate coats are applied, if desired. These contain preferably nothing but polyvinyl fluoride and latent solvent. They are applied and baked on in the same manner as the ground coat. The adherence of these intermediate coats to the ground coat is excellent.

An intermediate coat is applied particularly when the sheet metal is to be given special protection against corrosion on the underside or back, which otherwise would remain untreated except for the ground coat. After the intermediate coat is applied the coated plate already exhibits good corrosion resistance in the Kesternich test (Cf. DIN 50,018 and "Stahl und Eisen" 71(1951) pp. 587–588).

The finish coat is applied in much the same manner as the intermediate coat. It can also contain pigments and dyes which are stable at the bake-on temperatures. It is preferably brushed on. The concentration of the dispersions depends, like that of the plastisols and organosols, on the PVF particle sizes and their distribution, and on the nature of the latent solvent, which together determine the rheological behavior of the dispersions; dispersions can be used which contain 60 percent and more of solids, such as PVF, stabilizers, pigments and the like.

EXAMPLE 1

A sheet of pure aluminum, which has been degreased with solvents and dilute lye until it is uniformly wettable with water, is dried and treated by the dipping method (in steps a and b) and by brush application (in step c) with the following PVF dispersions:

|   | | MgO | PVF | TiO$_2$ | Propylene carbonate |
|---|---|---|---|---|---|
|   | | | Parts by Weight | | |
| a | Ground coat | 1 | 6 | — | 25 |
| B | Intermediate coat | — | 10 | — | 40 |
| C | Finish coat | — | 80 | 20 | 150 |

Baking time: a 4 min. b 2.5 min. c 3.5 min. at 250° C.

After cross scoring and grid scoring followed by Erichsen deep drawing of 10 mm (to rupture), the adherence of the coating is so good that no loosening of the film takes place, and they can be scratched off but not pulled off. With the cut edges of the sheet metal resist-coated in each case, after 10 rounds of Kesternich corrosion testing with 2 liters SO$_2$ and cross cutting and deep drawing by the Erchsen test method, where was no difference in the above test results on the front surface (steps a, b, and c). The coating on the back (steps a and b) remained firm and unaltered, even in the deep drawing area.

After 20 rounds of Kesternich corrosion testing, grid scoring and deep drawing by the Erichsen method, the front surface is undamaged in the uncut area, and in the deep drawing area the strips of finish are firmly adherent and can be pulled off only with difficulty. The back, however, is somewhat altered, and at the deep drawing area (metal fracture area) the film is pulled away.

After 40 rounds of Kesternich corrosion testing, cross scoring and deep drawing by the Erichsen method, the coating on the front surface is undamaged in the unscored areas and the segments of the coating in the cross cut area have not been stripped and can be pulled off only with difficulty.

In the 1,000-hour boiling test in water at 100° C, no change occurs in the strength of the adhesion of the coating. If the test pieces are then cross scored and deep drawn, still no pulling away of the coating occurs.

EXAMPLE 2

The experiment of Example 1 was repeated with sheets made of aluminum alloy (A1 with 3% Mg). The results were similar to those of Example 1.

EXAMPLE 3

(For comparison with Examples 1 and 2)

A finish coat directly applied to cleaned sheets of Example 1 and 2 without a ground coat exhibits no particular strength of adhesion and is easily pulled off. On a sheet casting machine a PVF cast sheet can be made with the finish-coat dispersion on an aluminum band as support, and is easy to remove and roll up on a winder after it has cooled.

EXAMPLE 4

A metallically clean plate of SM Steel RRSt 1405 is given two coats of PVF dispersions as follows:

|   | | MgO | PVF | TiO$_2$ | Propylene carbonate |
|---|---|---|---|---|---|
|   | | | (Parts by weight) | | |
| a | Ground coat (dipped) | 1 | 6 | — | 25 |
| b | Finish coat (brushed) | — | 80 | 20 | 150 |

Coat a is baked on for 4 minutes at 270° C. and coat b for 4.5 minutes at 250° C.

After 20 rounds of Kesternich corrosion test, cross scoring, grid scoring followed by Erichsen deep drawing of 10 mm, the coating is smooth and tight in the unscored area and is also firmly adherent in the scored and deep-drawn areas. Only after an initial prying loose with a knife can about 1 mm of the coating be pulled away, but then the film breaks, which signifies that the adherence is greater than the tensile strength of the film.

EXAMPLE 5

A raw piece of sheet metal as in Example 4 is treated with three coats consisting of the following PVF dispersions:

| | MgO | PVF | TiO$_2$ | Propylene carbonate |
|---|---|---|---|---|
| | | (Parts by weight) | | |
| a Ground coat (dipped) | 1 | 6 | — | 25 |
| b Intermediate coat (brushed) | — | 10 | — | 40 |
| c Finish coat (brushed) | — | 80 | 20 | 150 |

Baking time:
 a 3 min. at 270° C.
 b 5 min. at 270° C.
 c 4 min. at 250° C.

After 40 rounds of the Kesternich test, cross scoring, grid scoring and Erichsen deep drawing, the coat is tightly adherent and has a smooth, unaltered surface.

The same results were obtained when the ration MgO:PVF: polycarbonate was varied to 1:4:17 and 1:5:21.

EXAMPLE 6

A steel plate coated by the Sendzimir**[cf. "Protective Coatings for Metals" by Burns and Bradley, Reinhold Publishing Co., 1967 page 113/116] process with a zinc coating 300 microns thick and a zinc phosphate coating about 3 microns thick was coated as follows:

| | MgO | PVF | TiO$_2$ | Propylene carbonate |
|---|---|---|---|---|
| | | (Parts by weight) | | |
| a Ground coat (dipped) | 1 | 6 | — | 25 |
| b Second coat (brushed) | — | 10 | — | 40 |
| c Finish coat (brushed) | — | 80 | 20 | 150 |

Baking time:
 a 5 min. at 270° C.
 b 3 min. at 270° C.
 c. 4 min. at 250° C.

After 20 rounds of the Kesternich test, cross scoring and Erichsen deep drawing, the coating is firmly adherent and cannot be pulled off.

After 40 rounds of the Kesternich test, the coating is tight, too, but the surface is somewhat duller and rougher.

After 376 hours of standing in boiling water, cross scoring and Erichsen deep drawing, the coating is firmly adherent and can be scratched off, but not pulled from the metal.

EXAMPLE 7

A steel plate phosphatized with zinc phosphate and having a phosphate coating ground down to 3–4 microns was brushed under running water to remove the phosphate dust, and then washed with acetone, dried, and coated as in Example 6. The performance of the coating is the same as in Example 6.

EXAMPLE 8

A steel plate phosphatized with 1.5 to 3 g/m$^2$ of zinc phosphate and ground down to a phosphate coating about 1.5 microns thick was brushed under running water to remove the phosphate dust, washed with acetone, dried, and coated as follows:

| | MgO | PVF | TiO$_2$ | Propylene carbonate |
|---|---|---|---|---|
| | | (Parts by weight) | | |
| a Ground coat | 1 | α) 4 | — | 18 |
| | or 1 | β) 5 | — | 21 |
| | or 1 | γ) 6 | — | 25 |
| b Second coat (brushed) | — | 10 | — | 40 |
| c Finish coat (brushed) | — | 80 | 20 | 150 |

Baking time:
 α) a 5 min. at 270° C.; b 3.5 min. at 250° C.; c 4 min. at 250° C.
 β) a 2.5 min. at 270° C.; b 4 min. at 270° C.; c 4 min. at 250° C.
 γ) a 5 min. at 270° C.; b 4 min. at 250° C.; c 4 min. at 270° C.

All of the coatings perform in a similar manner.

After 20 rounds of Kesternich corrosion test and cross scoring, grid scoring and Erichsen deep drawing, the surface coating is tight and shows no surface etching. If the coating is lifted with a knife between the cross-scorings, which can be done in only very small pieces, the phosphate coating adheres firmly to the PVF film and the iron is metallically bright; this means that the PVF adheres better to the phosphatizing then the phosphatizing does to the metal. After 1,000 hours of standing in boiling water, no effect is produced on the PVF coating and the strength of adhesion.

EXAMPLE 9

A piece of sheet metal as in Example 8 is coated as follows:

| | MgO | Kaolin | PVF | TiO$_2$ | Propylene carbonate |
|---|---|---|---|---|---|
| | | (parts by weight) | | | |
| a Ground coat (dipped) | 0.5 | 0.5 | 6 | — | 25 |
| b Second coat (brushed) | — | — | 10 | — | 40 |
| c Finish coat (brushed) | — | — | 80 | 20 | 150 |

Baking time:
 a 5 min. at 270° C.
 b 3 min. at 250° C.
 c 4 min. at 250° C.

After 20 rounds of Kesternich test, cross scoring and Erichsen deep drawing, the surface coating is somewhat rough and not quite smooth, but the coating between the cross scorings can be removed only by scratching through them; adherence, however is very firm.

EXAMPLE 10

A hot-galvanized steel plate with a zinc coating 50 microns thick was degreased with CCl$_4$, very briefly treated with dilute H$_3$PO$_4$, rinsed, dried, and coated with the following PVF dispersions:

| | MgO | PVF | TiO$_2$ | Propylene carbonate |
|---|---|---|---|---|
| | | (Parts by weight) | | |
| a Ground coat (dipped) | 1 | 6 | — | 25 |
| b Second coat (brushed) | — | 10 | — | 40 |
| c Finish coat (brushed) | — | 80 | 20 | 150 |

Baking time:
 a 3 min. at 280°
 b 3.5 min. at 280°
 c 4 min. at 250°

When a transparent adhesive tape (Scotch tape) is applied to the finish after it has been cross scored and grid scored, pulling the film off removes none of the second areas. In the Erichsen deep drawing test, the zinc coating is destroyed by being pulled apart, but the adhesion of the coating remains unaffected.

EXAMPLE 11

A galvanically zinc coated steel plate having a zinc coating of about 2.5 microns, was washed with $CCl_4$, dried, and coated as in Example 8. The results are the same as in Example 8. The coating does not come off in the deep drawing test until the metal breaks.

EXAMPLE 12

(For comparison purposes)

A commercially available zinc coated steel plate to which a PVF sheet (thickness 50 microns) had been bonded by means of a methacrylic acid ester-type adhesive, was tested for comparison purposes.

After cross and grid scoring followed by Erichsen deep drawing, the cut sections of the upper third of the cup formed by the drawing come off. The grid strips come off up to half the depth of the cup. In both cases the separation has occurred between the adhesive and the PVF.

After 100 hours of standing in boiling water, a plainly evident formation of bubbles between the PVF sheet and the adhesive layer has taken place. The PVF sheet has come loose and can be pulled off. After 360 hours of standing in boiling water, followed by cross scoring and Erichsen deep drawing, the scored sections come off up to the edge of the cup. The adhesive is present on the removed film sections and there is a zinc layer on top of that. The rest of the zinc coating is on the sheet metal in the deep-drawn cup.

After 10, 20 and 40 rounds of the Kesternich corrosion test, the coating in the unscored areas is smooth and undamaged. In the cross scoring and grid scoring and Erichsen deep drawing test, the coating is still completely tight after 10 rounds, but after 20 rounds the scored coating comes off in the deep drawing test together with the adhesive up to three-fourths of the deep-drawn cup.

In the examples, the primer coats are about 15–20 microns in thickness. In Examples 1 and 2, the surface of the aluminum or aluminum alloy can be chromatized. Instead of the basic oxides used in the examples, other oxides disclosed can be used. Similarly, the other solvents disclosed can be used.

Latent solvents as hereinbefore described are solvents, which have no dissolving power at room-temperature, but which give with PVF a solution or a gelatinous phase at elevated temperatures. Furthermore these solvents can be evaporated from their solutions or a gelatinous phase when heated to still higher temperatures analogous to the diluting medium in organosols.

Cross-scoring and grid-scoring are methods for adhesion measurement based on knife-cutting methods according to DIN 53 151.

The method of Erichsen is a test for the resistance of a coating to deformation and destruction by deep-drawing metal-sheets by means of a steel-ball until the metal-sheet becomes ruptured as described in DIN 53 156.

What is claimed is:

1. In the coating of metal with polyvinyl fluoride by applying a primer coat to the metal surface and applying a finish coat of polyvinyl fluoride over the primer coat, the improvement which comprises providing the primer coat by applying a mixture consisting essentially of a basically reacting oxide of Group II or PbO and polyvinyl fluoride dissolved or suspended in an organic solvent, the weight ratio of said oxide to polyvinyl fluoride in said mixture being 1:3 to 1:8 and drying the primer coat.

2. Process according to claim 1, wherein the primer coat is baked on at a temperature of 230°–320° C.

3. Process according to claim 2, wherein the oxide is magnesium oxide, barium oxide, strontium oxide, calcium oxide, zinc oxide or PbO.

4. Process according to claim 2, wherein the oxide is magnesium oxide.

5. Process according to claim 2, wherein the oxide is zinc oxide or PbO.

6. Process according to claim 2, wherein the oxide is, in grain fineness, 100 percent less than 10 microns.

7. Process according to claim 2, wherein said mixture for the primer coat comprises an extender.

8. Process according to claim 2, the primer coat being applied by dipping.

9. Process according to claim 2, wherein said solvent is dimethyl acetamide, isophorone, dimethyl phthalate or propylene carbonate.

10. Process according to claim 2, wherein the coat of polyvinyl fluoride applied on the primer coat is an intermediate coat applied by applying on the primer coat a mixture consisting of polyvinyl fluoride and solvent and baking to dry the intermediate coat, and the step of applying on the intermediate coat, a coat of polyvinyl fluoride.

11. Process according to claim 2, said metal surface being aluminum, chromatized aluminum, steel, zinc, or phosphatized steel.

12. Process according to claim 2, where the finish coat is baked on.

13. Process according to claim 2, wherein the primer coat is applied by spraying.

14. Process according to claim 1, wherein the primer coat is baked on at a temperature of 250°–280° C.

15. A metal article having a surface thereof coated with polyvinyl fluoride and having a primer coat for the polyvinyl fluoride consisting essentially of the dried residue of a basically reacting oxide of Group II or PbO and polyvinyl fluoride dissolved or suspended in an organic solvent, the weight ratio of said oxide to polyvinyl fluoride in said mixture being 1:3 to 1:8.

* * * * *